(No Model.) 2 Sheets—Sheet 1.

O. T. BLÁTHY.
TRANSFORMER MOTOR.

No. 464,671. Patented Dec. 8, 1891.

WITNESSES:
George Baumann
John Revell

INVENTOR
Otto Titus Bláthy
BY
Howson and Howson
his ATTORNEYS (No Model.) 2 Sheets—Sheet 2.
O. T. BLÁTHY.
TRANSFORMER MOTOR.
No. 464,671. Patented Dec. 8, 1891.
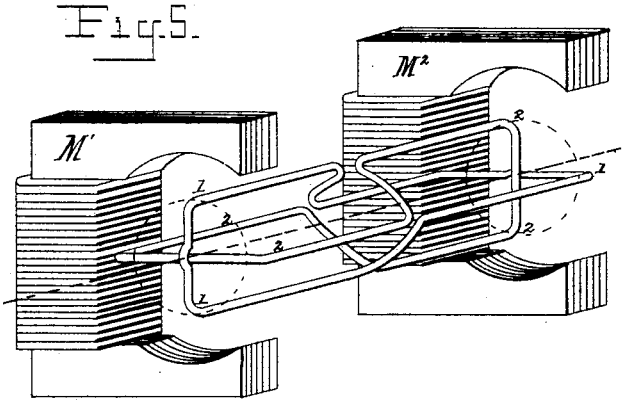
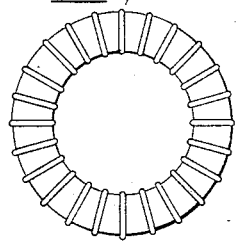
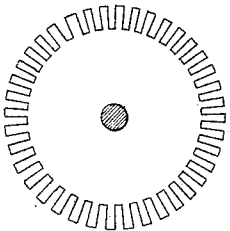
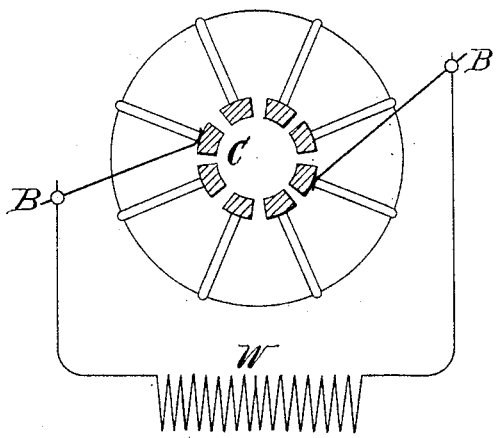
WITNESSES:
George Baumann
John Revell
INVENTOR
Otto Titus Bláthy
BY
Howson and Howson
his ATTORNEYS

UNITED STATES PATENT OFFICE.

OTTO TITUS BLÁTHY, OF BUDA-PESTH, AUSTRIA-HUNGARY.

TRANSFORMER-MOTOR.

SPECIFICATION forming part of Letters Patent No. 464,671, dated December 8, 1891.

Application filed November 8, 1889. Serial No. 329,688. (No model.)

*To all whom it may concern:*

Be it known that I, OTTO TITUS BLÁTHY, a subject of the King of Hungary, and a resident of Buda-Pesth, Austria-Hungary, have invented a Transformer-Motor, of which the following is a specification.

This invention consists of an electromotor for alternate currents, which may be considered as composed of a transformer and a motor part changing roles periodically. This arrangement dispenses with the introduction of the current by a commutator and brushes and does away with the inconvenience arising therefrom.

The essential parts of this motor are an armature with coils or windings closed upon themselves, which may also be regarded as composed of two armatures the coils of which are severally closed upon each other—that is, each coil of one half of the armature is closed upon one coil of the second half—and two field-magnets excited by two alternate currents displaced in phase from one another, the coils of the two armatures being distorted with reference to each other.

Figure 1:
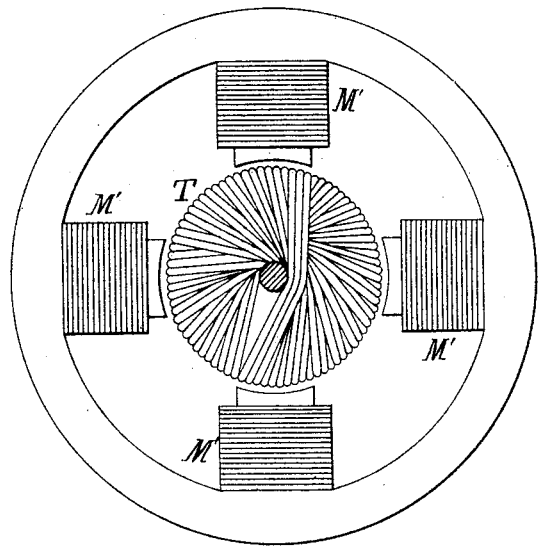
Figure 2:
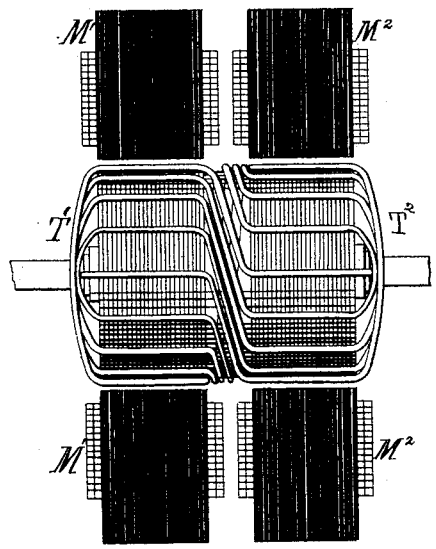
Figure 4:
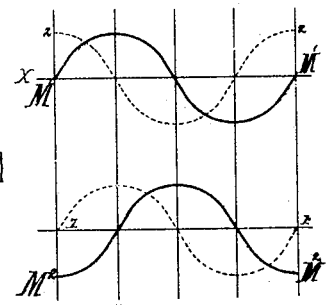
Figure 3:
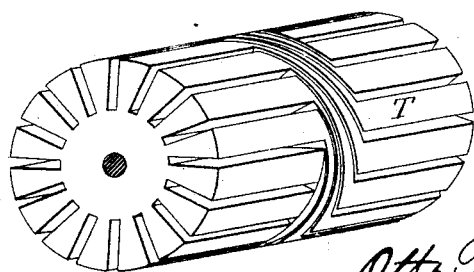

In the accompanying drawings, Figure 1 is a side view of my transformer-motor. Fig. 2 is a vertical section, and Fig. 3 is a perspective view, illustrating a modified form of armature. Fig. 4 is a diagram. Fig. 5 is another diagram. Figs. 6, 7, and 8 are views illustrating modifications.

To explain the manner of operation of my motor, let us first assume the armature at rest and take into consideration two coils at right angles only—say 1 and 2, Fig. 5—but one half of the coils being distorted with reference to the other.

The axes of polarity of the two field-magnets $M'$ and $M^2$ being parallel, if the current of $M'$, and therefore its magnetization also, is displaced with respect to current and magnetization of $M^2$ for a quarter of a wave in phase, as graphically indicated in Fig. 4 by the curves $M'$ and $M^2$, then this displacement in phase will also exist between the currents induced by $M'$ in the closed armature-coil 2 and by $M^2$ in the closed armature-coil 1, respectively. (See the dotted lines in Fig. 4.) Therefore when the current in coil 1 is at its maximum value that in 2 will just be at zero, and vice versa. Besides this, the phases of currents in 1 and 2 being displaced for nearly one-quarter of a wave with respect to the intensities of magnetism in the inducing-fields $M^2$ and $M'$ by the distortion of the two halves of the armature-coils, the current induced in one of the coils coincides in phase with the magnetism of the other field, and thus a torque will act upon the coil and therefore on the armature. The torques will also vary according to curves like those of $M'$ and $M^2$ in Fig. 4. The torques on coils 1 and 2 are therefore displaced in phase between themselves by a quarter of a wave, and the resulting torque will be nearly constant.

I have chosen the name of "transformer-motor" to indicate that the two halves of the electromotor—viz., $M'$ with $T'$, and $M^2$ with $T^2$—form alternately a transformer and a motor. If the armature is revolving, the several coils are successively passing the neutral planes—that is, the planes in which there is a maximum current in the coils and maximum torque. Coils which are not in these planes are at the same time submitted to the induction and torque of both the fields. With respect to these coils the apparatus is therefore a transformer and a motor at the same time.

My motor may be modified in a variety of ways, either by altering the armature alone or the fields, or both. If the space within the coils be filled up with subdivided iron, the result will be a drum, as shown in Fig. 2. To diminish the magnetic resistance, the drum may be provided with channels or slots at its circumference, into which the wires are placed, Fig. 6. Instead of a drum, a ring with closed coils may be used, Fig. 7. The iron core of the drum or ring is subdivided and the windings are fixed in the manner well known in the art. The armature-coils may be actual windings, as customary in dynamos, or the subdivided iron core may be provided with a metallic shell with suitable slots to direct the induced currents into the desired paths, as illustrated in Fig. 3. Both the cores of the field-magnets and of the armature must be subdivided in the well-known manner to guard against the generation of so-called "Foucault currents" in the iron masses. The external form of the field-magnets admits a very large number of variations, as nearly all the forms used in dynamo machinery can be adapted to my motor also. The number of poles of each of the two magnet systems may be any even number.

In the construction of the armatures heretofore set forth each coil was always closed upon itself. If it be desired to keep all the coils or a part of them closed only for a certain interval of time, a commutator C, Fig. 8, with sectors for each coil, is used, with brushes B on it, the brushes being connected together either directly or by resistances W.

The external form of the field-magnets as well as the amount of the displacement of the phases and the size of the angle under which the field-magnets are placed relatively to one another are not essential features in any of the different variations of my invention.

I do not desire to claim in this case, broadly, a transformer-motor having the general characteristics herein set forth, as that forms the subject of a separate application for a patent filed by me March 24, 1891, Serial No. 386,179; but—

I claim as my invention—

A transformer-motor for alternate currents, consisting of two field-magnets or groups thereof adapted to receive alternating currents of different phases, in combination with an armature provided with closed coils having one part distorted with reference to the other, as and for the purpose set forth.

In testimony whereof I have signed my name to this specification in the presence of two subscribing witnesses.

OTTO TITUS BLÁTHY.

Witnesses:
 CLARENCE FELDMANN,
 MORITZ HOOR.